United States Patent [19]

Dergarabedian et al.

[11] Patent Number: 4,603,075

[45] Date of Patent: Jul. 29, 1986

[54] INSOLE COMPOSITES AND PROCESSES FOR MANUFACTURING INSOLE COMPOSITES AND FOOTWEAR MATERIALS

[75] Inventors: Anthony Dergarabedian, Westfield; Robert L. Daigneault, Belchertown, both of Mass.

[73] Assignee: Texon, Inc., Farmington, Conn.

[21] Appl. No.: 598,794

[22] Filed: Apr. 10, 1984

[51] Int. Cl.$^4$ .............................................. B32B 5/02
[52] U.S. Cl. .................................... 428/235; 156/148;
428/234; 428/240; 428/247; 428/250; 428/300;
428/301; 428/325; 428/340; 428/492
[58] Field of Search ................. 156/148; 428/234, 235,
428/247, 300, 301, 250, 492, 325, 240, 241, 272,
340, 219

[56] References Cited

U.S. PATENT DOCUMENTS

| | | | |
|---|---|---|---|
| 3,284,872 | 11/1966 | Closson | 428/235 |
| 3,307,990 | 3/1967 | Homier et al. | 428/235 |
| 3,312,584 | 4/1967 | Charlton et al. | 428/235 |
| 3,546,059 | 12/1970 | Isgur et al. | 428/235 |
| 4,154,335 | 5/1979 | Burnett et al. | 428/235 |
| 4,172,170 | 10/1979 | Foye | 428/234 |
| 4,243,446 | 1/1981 | Mathey | 156/148 |
| 4,277,531 | 7/1981 | Picone | 428/235 |
| 4,504,538 | 3/1985 | Massallem | 428/300 |

*Primary Examiner*—James J. Bell
*Attorney, Agent, or Firm*—Thomas S. Szatkowski

[57] ABSTRACT

Novel, improved insole composites comprising a nonwoven fiber batt needle-punched to one side of a woven polymeric scrim and which is subsequently impregnated or saturated with a curable or cross-linkable polymer.

The invention also presents novel processes for producing the insole composites and for manufacturing footwear comprising the novel, improved insole composites.

13 Claims, No Drawings

INSOLE COMPOSITES AND PROCESSES FOR MANUFACTURING INSOLE COMPOSITES AND FOOTWEAR MATERIALS

THE FIELD OF THE INVENTION

This invention relates to novel footwear insole composites and to novel improved processes for manufacturing footwear insole composites and for manufacturing footwear having injection molded components.

DESCRIPTION OF THE PRIOR ART

Insole footwear composites are known products of commerce and their performance characteristics are well defined. Essentially, insole footwear composites should provide a degree of flexibility but have high tensile strength, low extensibility and good overall dimensional stability. Additionally, such composites should have low porosity and permeability to fluids (liquids and gases). For example, insole composites used in footwear manufacturing processes involving injection molding of the sole component, should be effectively impervious and resistant to cements and/or to the polymer(s) employed for injection. Otherwise excessive bleed-through of injection molded polymeric materials will occur. Moreover, since insole composites are usually stitched to the upper, insole composites are normally readily stitchable.

Insole footwear composites comprising woven polymeric scrims having non-woven fibers needle-punched to the scrim are known. One such composite is sold commercially by Texon Incorporated under the designation TEXON-30. TEXON-30 comprises a woven polypropylene scrim having a non-woven, polyester fiber batt needle-punched to the scrim. The scrim comprising the needle punched polyester batt is coated on one side with a polymeric latex such as a acrylic latex.

Other known insole footwear composites comprising non-woven fibers adhered to reinforcing layers comprising polymeric films or polymeric woven scrims are disclosed in commonly owned, copending U.S. application Ser. No. 560,586 filed Dec. 12, 1983 and in U.S. Pat. No. 4,243,446 and in U.K. Pat. No. 1,182,669.

BRIEF SUMMARY OF THE INVENTION

The novel, improved insole composites of this invention comprise a non-woven fiber batt needle-punched to one side of a woven polymeric scrim and which is subsequently impregnated or saturated with a curable or cross-linkable polymer. On curing, the polymer saturant provides a polymeric film which is effectively impervious and resistant to bleed-through of cements or injection molded polymeric materials. The composites are soft, flexible insoles having high tensile strength, resistance to elongation or stretch, exceptionally high internal bond strength and are readily stitchable at the feather line.

The novel process for producing insole composites of this invention essentially involves the steps of needle punching a non-woven fiber batt to one side of a woven polymeric scrim, impregnating or saturating the needle punched product with a curable polymer and heating the saturated composite to dry the composite and to cure the polymer.

The novel process for manufacturing footwear comprising the improved insole composites of the invention comprises stitching an insole composite of the invention to an upper and injection molding a polymeric footwear component to the stitched insole and upper.

DESCRIPTION OF PREFERRED EMBODIMENTS OF THE INVENTION

Woven polymeric scrims are known to the art as reinforcing members of insole composites. Polymeric materials used to manufacture known woven scrims include, among others, polymers and copolymers of polyethylene, polypropylene, polyesters, polyamides and the like. Normally, the reinforcing properties of the scrims are determined by the polymeric material used in the scrim, the tightness of the weave and the thickness and weight of the woven scrim. Woven scrims comprising nylon for example are extremely effective reinforcing composites for insoles composites but are expensive and woven nylon scrims find limited applications in the shoe manufacturing art. Thicker and/or tightly woven and/or heavier polymeric scrims also provide improved reinforcing members but are also relatively expensive. The scrims most commonly employed in the art comprise polypropylene and have thicknesses between about 0.010 to about 0.020 inches and weights between about 3.0 to about 6.0 ounces per square yard and weaves consisting of from about 12 to about 24 threads in the warp and weft directions. Because of the high internal bond strength achieved in the insole composites of the present invention, considerable latitude is presented in selecting and effectively utilizing the less expensive, lighter weight, more open weave scrim materials. For example, the preferred scrim material in the practice of the invention is a 100 percent polypropylene scrim having a weight of about 2.5 to about 3.5 ounces per square yard and a weave consisting of about 10 to about 15 threads in the warp direction and from about 10 to about 15 threads in the weft direction. The use of the lighter weight, more open weave scrim materials provides an attractive cost effective advantage for insole composites of this invention.

Non-woven fibers pre-needled into a batt which can be needle-punched to woven polymeric scrims are also known to the art. Such batts include natural and synthetic non-woven fibers commonly used in the manufacture of non-woven fabrics. Polyester fibers are commonly used and are suitable in the practice of the invention. The especially preferred non-woven fiber batt in the practice of the invention is a fiber batt having a weight from about 4.0 to about 8.0 ounces per square yard and comprising from about 20 to about 60 percent by weight 6.0 denier polyester fiber and from about 20 to about 60 percent mixed denier fiber which may or may not consist of 100 percent polyester fiber. Fibers of mixed denier are relatively inexpensive and their use in the practice of the present invention presents another attractive cost effective advantage.

The preferred insole composites comprise a polyester fiber batt needle-punched to a polypropylene scrim by needling the batt to the scrim through one side of the scrim to provide a dimensionally stable reinforcing member. Needle-punching processes and machines are known to the art. The preferred needle-punching operation provides a needle punched scrim product about 58 inches in width and having a weight from about 8 to about 11 ounces per square yard. In the preferred operation, the polyester fibers are laid out in a Rando web operation to provide a non-woven web which is needle-punched to provide a batt having a weight between about 5 to about 8 ounces per square yard. The batt is laid on the scrim, and needle-punched in one direction from the batt side through to the scrim side. This pushes some of the fibers of the non-woven batt through the scrim so that the fibers become an integral part of the scrim and are distributed on both sides of the scrim.

As mentioned, one of the cost effective advantages of the present invention is that fibers of mixed denier can be used to provide insole composites of high performance characteristics. When fibers of mixed denier are used in preparing the needle-punched scrim product, a hot calendering operation is preferably employed after the needle-punching. Temperatures between about 100° F. to about 220° F. are suitably employed in the calendering operation. The hot calendering operation provides a substantially uniform gauge across the width of the needle-punched product. A preferred gauge range for needle punched scrim products of the present invention is from about 0.030 to about 0.050 inches as measured on a Cady gauge.

The needle-punched scrim product of the invention is saturated with a polymeric dispersion according to conventional web saturation operations. Essentially a substantially continuous web of the needle-punched product about 58 inches wide is continually fed to a saturater at a rate of from about 10 to about 20 yards per minute. Preferably, the web is fed so that the scrim side contacts the saturant first in order to promote more effective saturation. During saturation, the needle-punched scrim product is completely wetted and impregnated with the saturant. After passing through the saturater, the saturated web is conveyed between nip rolls having a gap designed to adjust pick-up of saturant by the web to provide between about 0.375 pounds of saturant per square yard to about 0.625 pounds of saturant per square yard in the dry product. The saturated web is then preferably conveyed over a plurality of steam heated can dryers to heat the web to temperatures between about 250° F. to about 300° F. The heating drys the saturated web and cures the polymer to provide a substantially non-porous, effectively impervious polymeric film distributed throughout the interstices of the web and about the surface of the web. The non-porous film renders the composite resistant to air flow and effectively impervious to molten polymeric materials providing injection molded footwear components. The dried web is then calendered to the finished gauge which can be between about 0.040 to about 0.070 inches. The calendering densifies the composite which further reduces the porosity of the composite thereby improving resistance of the composite to air flow.

The saturants of the present invention include polymeric dispersions comprising nitile containing polymers curable (preferably self-curable) at temperatures between about 250° F. to about 300° F. or somewhat higher and having glass transition temperatures between about $-10°$ C. to about $-40°$ C. as measured by a differential-scanning colorimeter (DSC) (a Du Pont 1090 Thermoanalyzer fitted with a DSC cell and heated at a rate of 10° C. per minute). Additional properties of polymers suitable in the practice of the invention is that the polymers have the capability on curing to form a substantially impervious film and the capability of providing a composite having a tensile strength of about 100 pounds per square inch or more and a resistance to elongation or stretch of no more than about 2 percent at 20 pounds per inch load. Preferred polymers in the practice of the invention are nitrile butadiene copolymers especially acrylonitrile styrene butadiene copolymers having from about 15 to about 35 percent by weight acrylonitrile based on the total weight of the polymer, from about 20 to about 30 percent by weight styrene and from about 35 to about 65 percent by weight butadiene. Especially preferred polymers are carboxylated acrylonitrile styrene butadiene copolymers having a degree of carboxylation between about 0.5 to about 5.0 percent.

Polymer dispersions suitable in the practice of the invention can include additives in combination with the polymer. Suitable additives are fillers, dispersing agents, thickening agents and pigments among others. Clay is a particularly preferred filler since it not only reduces cost but also aids in sealing the needle-punched holes in the scrim and provides a better surface for bonding a liner or sock to the composite. Finely divided, particulate clays having a particle size such that about 99 percent or more of the particles will pass through a 325 mesh screen are preferred fillers for saturants used in the practice of the invention. The amount of clay included in the saturant can vary over a wide range such as from 0 to about 65 percent by weight clay based on the total weight of clay and polymer (as solids) in the saturant. Especially preferred saturants are those in which the amounts of clay and polymer in the saturant are substantially equivalent. For example, saturants containing between about 45 to about 55 percent by weight clay based on the total weight of clay and polymer are preferred. An especially preferred saturant designated as Saturant A is an aqueous dispersion of the ingredients listed below;

| SATURANT A. | | |
|---|---|---|
| | lbs(wet) | lbs(dry) |
| Water | 100.0 | — |
| Dispersing Agent[1] | 1.0 | 0.39 |
| Filler[2] | — | 100.00 |
| Latex[3] | 204.5 | 100.00 |

[1]The dispersing agent used was a commercially available dispersion of an ammonium salt of a polymeric carboxylic acid having a ph of about 7.5 to about 8.5 and a specific gravity of about 1.16. The dispersing agent is sold under the tradename DISPEX A40 by Allied Colloids Manufacturing Company Ltd.

[2]The filler used was a commercially available air floated clay having a surface area of about 15 m$^2$/g and a 325 mesh screen residue of about 0.4 percent maximum. The clay is sold under the Trademark HI-WHITE by J.M. Huber Corporation.

[3]The latex used was a commercially available carboxylated acrylonitrile styrene butadiene copolymer containing about 25 percent by weight styrene. The latex contained about 49.0 percent non-volates, had a ph of about 8.5, a Brookfield viscosity of 600 cps max. (#2 Spindle at 20 rpm), a weight per gallon of about 8.35 pounds and the specific gravity of the solids is about 0.99. The latex is sold under the Trademark TYLAC 68-150 by Reichhold Chemicals Incorporated.

The above SATURANT A was prepared by mixing the dispersing agent and filler in 100 pounds of water until the filler is substantially completely dispersed. The latex was then added to the dispersion and the mixture was agitated for about 15 minutes to provide a uniform dispersion of clay and polymer saturant.

An insole composite was prepared by forming a web of a non-woven batt needle-punched to a polypropylene scrim as described. The non-woven batt was a needle-punched polyester batt consisting of 50 percent by weight 6.0 denier polyester fibers and 50 percent by weight mixed denier, primarily polyester fiber. Batt weight was approximately 6.8 ounces per square yard. The scrim comprised a yarn of an extruded split polypropylene of about 1000 denier and had a weight of about 3.2 ounces per square yard with a weave consisting of about 12 threads in the warp and about 12 threads in the weft directions.

The web of the needle-punched product was saturated with SATURANT A in the manner described before at a rate of about 15 yards per minute. After saturation, the web was fed to nip rollers to adjust the saturant pick up by the web to provide about 0.475 pounds of saturant per square yard in the dry product. Drying the web and curing the polymer involved continually conveying the web about 23 steam heated can dryers each having a diameter of about 4 feet. The can dryers were arranged in series to provide two zones; an initial heating zone and, a drying and curing zone. The initial heating zone involved the first six dryers in the arrangement with the first-or most upstream-dryer and the second dryer of the zone heated to temperatures of about 150° F. The remaining four dryers of the initial heating zone were heated to temperatures of from about 220° F. to about 240° F. All of the 17 dryers of the drying and curing zone were heated to temperatures from about 250° F. to about 300° F. so that the web was heated at progressively increasing temperatures as it was conveyed over the successive dryers of the drying and curing zone. The last 4 dryers of the drying and curing zone were heated to temperatures of about 300° F. After drying, the web was calendered to a finished gauge of 0.060 inches.

The insole composite prepared as described above provides an economical insole which is soft, resilient and lightweight but at the same time strong, flexible and durable. Basic properties of the insole are listed below.

| | |
|---|---|
| Weight | 1.10 lbs/yd$^2$. |
| Gauge | 0.060 |
| Tensile Strength, MD | 100 min. |
| CD | 100 min. |
| Stretch Resistance at 20 lbs | |
| MD | 2.0% max. |
| CD | 2.0% max. |
| Taber Stiffness | 100-200 units |
| Air Porosity | Below 9.5 ft.$^3$/min./ft.$^2$ |

The insole composites of the present invention provides special advantages in footwear manufacturing involving injection molding of components particularly for injection molding of soles. Injection molding of soles is well known and commonly used in the manufacture of footwear especially for example in the manufacture of athletic footwear. A conventional, commonly used footwear manufacturing process involving injection molding of soles includes the steps of stitching the insole to the upper, arranging the stitched insole and upper in a mold and injecting molten polymer into the mold to form the sole which on cooling, is bonded to the insole.

In practice, the injection molding machine is equipped with precision molds made to match the lasts used for sewing the insoles to the uppers. The stitched insole and upper is placed into position in the loading station of the machine. Then the mold is closed around the bottom of the stitched insole and upper and a molten charge of polymeric soling material is forced into the cavity formed between the bottom of the mold and the bottom of the upper. The fluid injected into the mold is pre-heated and begins to cool and set immediately as it enters the mold. The mold itself, however, is usually not heated. Instead, it maintains enormous pressure on the heated fluid and assists in cooling the molded sole.

While the molding of the sole and attachment to the shoe is completed in a very short time, a multiple-station machine is often used to permit the soling material to set up and cool so that it can be readily handled and distortion of the sole can be avoided in removing the footwear product from the mold.

Insole composites of the invention exhibit superior stitch holding strength. They can be readily stitched to the upper at the feather line thereby reducing the lasting margin and saving upper material. Moreover, the edge of the insole composite stays on the feather edge when force lasted. It does not twist, pull away or distort and holds the upper down tightly to the last. In the preferred practice of the invention, the insole composite is stitched to the upper so that when the stitched upper and insole are arranged in combination with the mold, the injected molten polymer will contact the scrim rather than the batt side of the composite. In other words, the scrim side of the composite provides the bottom surface of the stitched upper and insole.

Insole composites of the invention have been used particularly in injection molding of soles comprising polyurethanes and polyvinylchlorides to provide footwear products in which the molded sole is strongly bonded to the midsole composite. Especially effective bonding of the insole to the sole is achieved with the above-mentioned polymeric sole providing materials without the need of added adhesives. However, selected compatable adhesives can be applied to the scrim side of the insole stitched to the upper prior to the injection of other polymeric sole providing materials to achieve improved bonding if desired.

The most outstanding advantage presented by insole composites of the present invention is that the composites are substantially resistant to air flow and also effectively impervious to bleed-through of cements or injected polymeric sole providing materials. Bleed-through of injected polymeric sole providing material through the insole is undesirable since the injected material becomes a part of the insole and can adversely affect the performance characteristics and/or the functions assigned the insole. For example, the material can affect the softness and/or the flexibility and/or the stretchability of the insole. Moreover the material can affect the bonding characteristics of the insole surface making bonding of liners or socks or the like to the surface more difficult and/or less uniform.

From the foregoing, it should be apparent that the insole composites of the present invention are extremely cost effective but also provide an exceptionally attractive combination of superior performance characteristics. The cost effectiveness is achieved by such factors as the use of less expensive, lighter weight, more open weave scrim materials, the use of fibers of mixed deniers and the use of clay as a filler in the saturant. However, the final insole composites are soft, resilient, light weight composites having exceptionally high internal bond strength which prevents delamination. The insole composites have high tensile strengths and low resistance to stretch according to commercial footwear standards. The combination of exceptionally high internal bond strength, high tensile and low stretch provides a insole composite having especially attractive stitching characteristics. Insole composites of this invention can be effectively stitched at the feather line thereby reducing lasting margins and saving upper material. The edge of the insole composite stays on the feather edge when force lasted. The composite does not twist; pull away, stretch or distort and holds the upper down tightly to the last. Moreover, the film provided by the polymeric saturant is a tough, coherent film distributed throughout the interstices of the composite and about the surface of the composite. The film is effectively impervious and provides the requisite resistance to air flow and also effectively prevents bleed-through of cements or molten polymeric materials used in injection molding of footwear components. Accordingly the invention presents to the art novel, improved insole composites having surprisingly unexpected advantages over insole components known to the art at the time the invention was made.

We claim:

1. A composite comprising a non-woven fiber batt needle-punched to a woven polymeric scrim and a cured copolymer saturant distributed throughout the interstices of the composite and distributed about the surface of the composite to render said composite resistant to air flow and effectively impervious to molded footwear components, said copolymer saturant comprising from about 15 to about 35 percent by weight acrylonitrile, from about 20 to about 30 percent by weight styrene and from about 35 to about 65 percent by weight butadiene and being curable at temperatures between about 250° F. to about 300° F. and having a glass transition temperature between about −10° C. to about −40° C. and said composite having a tensile strength of about 100 pounds per square inch or more and a resistance to elongation of no more than about 2 percent at 20 pounds per inch load.

2. A composite of claim 1 where the copolymer is a carboxylated acrylonitrile styrene butadiene copolymer having a degree of carboxylation between about 0.5 to about 5.0 percent.

3. A composite of claim 1 where the saturant further comprises clay in an amount up to about 65 percent by weight clay based on the total weight of copolymer and clay.

4. A composite of claim 3 where the amount of clay is between about 45 to about 55 percent by weight clay based on the total weight of copolymer and clay.

5. A composite of claim 1 or claim 2 or claim 3 or claim 4 where the non-woven fiber batt includes polyester fibers of mixed denier.

6. A composite of claim 1 or claim 2 or claim 3 or claim 4 where the non-woven fiber batt has a thickness between about 0.030 to about 0.050 inches, a weight between about 4.0 to about 8.0 ounces per square yard and comprises from about 20 to about 60 percent by weight of about 6.0 denier polyester fiber and from about 20 to about 60 percent by weight polyester fiber of mixed denier and where the scrim comprises polypropylene yarn and has a weight between about 2.5 ounces to about 3.5 ounces per square yard, a thickness between about 0.010 to about 0.020 inches and a weave consisting of and from about 10 to about 15 threads in the warp and weft direction.

7. A process for preparing a composite comprising the steps of:
a. needle punching a non-woven fiber batt to a woven polymeric scrim,
b. saturating the needle punched product with a polymer dispersion comprising a nitrile containing polymer curable at temperatures between about 250° F. to about 300° F. and having a glass transition temperature between about −10° C. to about −40° C. to distribute the polymer throughout the interstices of the product and about the surface of the product and
c. heating the saturated product at temperatures between about 250° F. to about 300° F. to dry the saturated product and cure the polymer to provide a composite having a tensile strength of about 100 pounds per square inch or more and a resistance to elongation of no more than about 2 percent at 20 pounds per square inch load.

8. A process of claim 7 where the copolymer is an acrylonitrile styrene butadiene copolymer comprising from about 15 to about 35 percent by weight acrylonitrile, from about 20 to about 30 percent by weight styrene and from about 35 to about 65 percent by weight butadiene.

9. A process of claim 8 where the copolymer is a carboxylated acrylonitrile styrene butadiene copolymer having a degree of carboxylation between about 0.5 to about 5.0 percent.

10. A process of claim 7 where the saturant further comprises clay in an amount up about 65 percent by weight clay based on the total weight of copolymer and clay.

11. A process of claim 10 where the amount of clay is between about 45 to about 55 percent by weight clay based on the total weight of copolymer and clay.

12. A process of claim 7 or claim 8 or claim 9 or claim 10 or claim 11 where the non-woven fiber batt includes polyester fibers of mixed denier.

13. A process of claim 7 or claim 8 or claim 9 or claim 10 or claim 11 where the non-woven fiber batt has a thickness between about 0.030 to about 0.050 inches, a weight between about 4.0 to about 8.0 ounces per square yard and comprises from about 20 to about 60 percent by weight of about 6.0 denier polyester fiber and from about 20 to about 60 percent by weight polyester fiber of mixed denier and where the scrim comprises polypropylene yarn and has a weight between about 2.5 ounces to about 3.5 ounces per square yard, a thickness between about 0.010 to about 0.020 inches and a weave consisting of and from about 10 to about 15 threads in the warp and weft direction.

* * * * *